Nov. 30, 1954 G. FIRTH 2,695,856

IMPREGNATION OF ELECTRICAL COMPONENTS

Filed Aug. 22, 1952

INVENTOR.

George Firth

BY William W Haefliger

United States Patent Office 2,695,856
Patented Nov. 30, 1954

2,695,856

IMPREGNATION OF ELECTRICAL COMPONENTS

George Firth, Los Angeles, Calif., assignor to McCulloch Motors Corporation, Los Angeles, Calif., a corporation of Wisconsin Application August 22, 1952, Serial No. 305,824

8 Claims. (Cl. 154—80)

This invention relates to novel processes for insulating electrical components, and more particularly to processes in which coils, transformers, and similar electrical apparatus are embedded with thermosetting resin by subjecting the embedding resin to high pressures and to local heating, whereby desired results comprising complete and rapid impregnation are rapidly and readily achieved.

It is an object of the present invention to provide a process in which preheated electrical components are embedded with thermosetting resin by subjecting the electrical components and resin to centrifugal force during curing of the resin.

It is another object of the present invention to provide a process in which preheated electrical components are embedded with liquid thermosetting resin under centrifugal pressure to prevent volatilization of resin components during curing thereof and thereby to preclude the formation of voids in the embedding resin.

Another object of the invention is to provide a process for embedding electrical components with liquid thermosetting resin in which pressures produced in the resin act to prevent resin shrinkage during curing.

Another object of the present invention is to provide a process for embedding electrical components with liquid thermosetting resin in which pressures produced in the resin act to uniformly compact the resin during curing thereof to yield a solidified embedding resin having high dielectric strength and increased power factor.

A further object of the present invention is to provide a process for impregnating electrical components with thermosetting resin in which the electrical components are heated before actual impregnation is begun in order to reduce the amount of water vapor present in the electrical components and also to provide a local internal heat source from which heat will flow by conduction into the liquid impregnating resin.

A still further object of the invention is to provide a process for impregnating electrical components with thermosetting resin in a container, in which the container is subjected to heating during curing of the resin in order to provide a local external heat source from which heat will flow by conduction into the liquid impregnating resin.

Various other novel features of the invention will be more clearly apparent from the following discussion of the invention in connection with the accompanying drawings which show one form of apparatus for practicing the invention as well as one form of electrical component upon which the invention may be practiced. In the drawings forming part of the specification:

Figure 1:
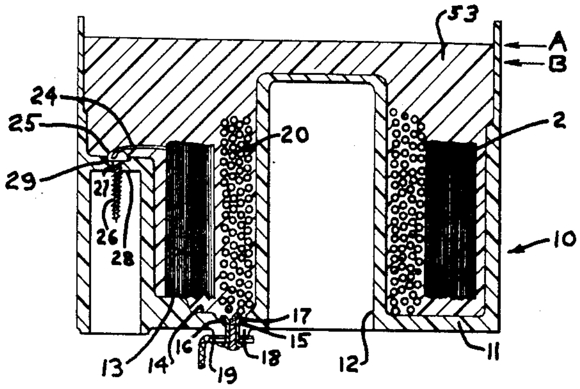
Figure 1 is a cross section of an ignition coil for use in connection with an internal combustion engine, the drawing illustrating a specific electrical element and container therefore with liquid impregnating resin introduced therein.

The specific electrical component illustrated which may be advantageously embedded with thermosetting resin by means of the present novel process comprises ignition coil assembly 10 illustrated in Figure 1. The coil case 11 is made of thermosetting resin and includes a central upstanding hollow shell 12 of reduced cross sectional area integrally formed therewith. The shell 12 provides space for the insertion of a magnetic core not shown.

In assembling the ignition coil unit, a hollow rivet 15, flanged at one end 16, is emplaced within recess 17 in the bottom wall 14 of the coil case 11 so that its tubular end protrudes outwardly from abutment 18 integrally formed on the outer surface of bottom wall 14. A primary lead 19 is fitted over the protruding end of the tubular rivet 16 and the free end of the rivet is upset so as to clamp the primary lead 19 against the surface of abutment 18. When the primary coil 20 is placed in position so as to encircle shell 12, the free end of the hot primary wire projects down through the tubular rivet 16 and is soldered in place therein, so as to provide electrical contact with primary lead 19 and also to seal up the rivet hole. The primary coil ground wire is likewise soldered in place within a similar tubular rivet not shown.

The high voltage secondary lead 24 projects outwardly from the secondary coil 21, and the end of the lead is soldered to the head 25 of a self-tapping screw 26. The secondary coil is placed in position within the coil case 11, as shown, with the lower face of the coil resting on radial ridges 13, which are integrally formed on the inner wall 14 of the coil case 11. The screw 26 is then fitted in aperture 27 in wall 23 of the coil case 11, and the screw head 25 is pressed into recess 29 in the wall 28. The ground lead of the secondary coil 21 is soldered in place in the tubular rivet containing the primary ground lead, not shown. Screw 26 and coils 20 and 21 are held firmly in position by the embedding resin 53 after the present embedding process is completed.

Figure 2:
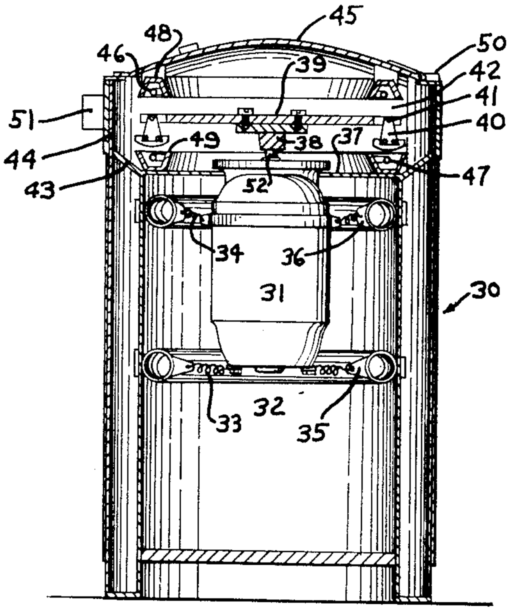
Figure 2 illustrates one form of centrifugal impregnator adapted for use in the present novel process for embedding electrical components with thermosetting resin.

In the centrifugal impregnator 30 illustrated in Figure 2, an electric motor 31 is mounted in chamber 32 by means of spring groups 33 and 34 which hang inwardly from hanger groups 35 and 36. Shaft 52 of motor 31 projects upwardly through inner wall 37 and is keyed to a coupling member 38 which in turn is bolted to spinner plate 39. A number of swingable holders 40 are equispaced about the periphery of spinner plate 39 and are attached thereto by means of gimbals 41. The spinner plate is rotated in heated chamber 42 defined by bottom wall 37, side walls 43 and 44, and cover 45. Annular resistive heating elements 46 and 47 are supported above and below spinner plate 39 within upper and lower reflectors 48 and 49. Reflector 49 is attached to wall 37, and reflector 48 depends downwardly from cover 45 which rotates upwardly at hinge 50. A thermostat 51 controls the air temperature within chamber 42.

In accomplishing the embedding process as adapted to the specific electrical component described above, a number of coil cases 11 with coils assembled therein are baked at temperatures between 150 and 300 degrees Fahrenheit between one and two hours. The hot coil cases are then placed in the holders 40 swingably attached to the spinner plate 39. Next, the liquid thermosetting resin 53 is prepared at room temperature and poured into the coil cases up to level A, indicated in Figure 1. When poured into the heated coil cases and over the heated coils, the particular thermosetting resin used had a viscosity somewhat greater than 100 centipoises. After filling the coil cases with resin, the lid 45 is closed, the spinner plate 39 brought up to speed, and the temperature in chamber 42 adjusted between 150 degrees and 300 degrees Fahrenheit, depending upon the particular embedding resin being used. As the angular velocity of the spinner plate 39 increases, the holders 40 swing outwardly under the action of centrifugal force so that the axes of symmetry of the coil cases 11 and holders 40 lie approximately horizontal. Also, the pressure developed in the liquid resin increases approximately as the square of the angular velocity of the spinner plate.

Since the electrical components were subjected to heating before impregnation was begun, the heat stored in these components flows into the liquid resin near the components, resulting in temporarily decreased resin flow resistance. As a result, favorable physical conditions of high pressure and decreased flow resistance specifically attend that portion of the liquid resin lying in intimate physical contact with the electrical elements being impregnated, during the actual curing cycle of the resin itself. It is also pointed out that external sources of heat comprising heating elements 46 and 47 are properly arranged to raise the temperature of the atmosphere in the chamber 42, and to irradiate and thereby heat the coil cases 11. As a result, heat supplied to the coil cases flows into the resin lying in intimate contact with the inner surfaces of the coil cases, bringing about a temporary decrease in resin flow resistance during curing of the resin.

In this way, the temporarily less viscous resin is forced under high pressure into the interstices of the electrical elements before the resin solidifies. The centrifugally induced resin pressure also prevents the volatilization of resin components which might otherwise vaporize and produce voids in the resin during solidification. These voids, if allowed to develop, would constitute areas of decreased dielectric strength, leading to possible failure of the electrical components in service. The centrifugally induced pressures in the resin also tend to eliminate resin shrinkage which normally accompanies the curing or setting up of the liquid resin.

It is to be noted that the temporarily less viscous resin under high pressure penetrates the small imperfections in the surfaces of the coil cases and electrical elements during curing and solidification of the resin, creating a strong mechanical bond therewith. This bond is characterized by minute interlocking surfaces, which prevent dislodgement of the solid resin from the embedded components and from the container under stressed conditions occurring in service, as for example during vibrations induced by internal combustion engines.

In the particular process of embedding the coil assembly illustrated, the resin filled coil cases were rotated at an angular velocity of approximately 1750 R. P. M. at a twelve inch radius arm so as to develop a pressure gradient in the curing resin 53 between 40 and 80 pounds per square inch per inch of depth. The temperature in chamber 42 was kept near 225 degrees Fahrenheit by thermostat 51, and the coil cases were rotated for approximately fifteen minutes. At the end of this time, the spinner plate was stopped and the coil cases removed from the impregnator 30. The resin level was found to have dropped to level B as indicated in Figure 1.

When a coil case was cut in half to examine the induced impregnation, the resin was found to have completely penetrated the interstices of the coils and to have cured therein. Furthermore, a very strong mechanical bonding was indicated between the resin and the coil case and coils. In no portion of the impregnating resin was there found to be any evidence of bubbling, and resin shrinkage away from the coil case and coils was entirely absent.

It is apparent that my invention may well be applied to the impregnation and insulation of many types of electrical equipment such as transformers, resistors, condensers, etc. It should be understood that my invention is in no way limited to the impregnation of the embodiments specifically described, and it is apparent that modifications may be devised by those skilled in the art without departing from the spirit of my invention or the scope of the claims.

I claim:

1. The method of embedding electrical elements with thermosetting resin which consists in: placing the electrical elements in a container to form an electrical assembly; preheating the assembly; introducing an embedding thermosetting resin in liquid form into the container and into physical contact with the electrical elements; revolving the container to produce a pressure gradient in the liquid resin at elevated temperatures; and maintaining the pressure gradient during at least a portion of the curing cycle of the resin.

2. The method of embedding electrical elements with thermosetting resin which consists in: placing the electrical elements in a container to form an electrical assembly; preheating the assembly; introducing an embedding thermosetting resin into the container and into physical contact with the electrical elements; revolving the container to produce a pressure gradient in the resin along the length axis of the container; and maintaining the pressure gradient during at least a portion of the curing cycle of the resin.

3. The method of embedding electrical elements with thermosetting resin which consists in: placing the electrical elements in a container to form an electrical assembly; preheating the assembly; introducing an embedding thermosetting resin into the container and into physical contact with the electrical elements; revolving container to produce a pressure gradient in the resin; and maintaining the pressure gradient during at least a portion of the curing cycle of the resin.

4. In the manufacture of electrical winding assemblies, the process which includes: preheating the winding assemblies at elevated temperatures; placing the preheated winding assemblies into containers; rotating said containers with their length axes substantially perpendicular to the axis of rotation; impregnating the winding assemblies with viscous thermosetting resin at elevated temperature; and continuing said rotation for a time interval sufficient for at least partial curing of said thermosetting resin.

5. In the manufacture of electrical winding assemblies, the process which includes: preheating the winding assemblies at elevated temperatures; rotating the winding assemblies with their length axes substantially perpendicular to the axis of rotation; impregnating the winding assemblies with viscous thermosetting resin in a heated atmosphere; and continuing said rotation for a time interval sufficient for at least partial curing of said thermosetting resin.

6. In the manufacture of insulated coils, the process which includes: preheating the coils; rotating the coils to subject them to centrifugal force; subjecting said rotating coils to impregnation with liquid thermosetting resin; maintaining said rotation during at least a portion of the curing cycle of the resin; and heating said coils and resin during rotation thereof.

7. The method of embedding electrical windings with thermosetting resin which consists in: placing the electrical windings into a container to form an electrical assembly; introducing an embedding thermosetting resin in liquid form into the container and into physical contact with the electrical windings; revolving the assembly to produce a pressure gradient in the liquid resin of at least 40 pounds per square inch per lineal inch of resin depth; and maintaining the pressure gradient during at least a portion of the curing cycle of the resin.

8. The method of embedding an electrical coil with thermosetting resin which consists in: placing the electrical coil into a container to form an electrical assembly; preheating the assembly; introducing an embedding thermosetting resin into physical contact with the electrical coils; subjecting the electrical assembly to centrifugal force to produce a pressure gradient in the resin of at least 40 pounds per square inch per lineal inch of depth; and maintaining the pressure gradient during at least a portion of the curing cycle of the resin.

References Cited in the file of this patent

UNITED STATES PATENTS

| Number | Name | Date |
|---|---|---|
| 2,234,608 | Robinson et al. | Mar. 11, 1941 |
| 2,351,717 | Soff | June 20, 1944 |
| 2,369,592 | Marinsky et al. | Feb. 13, 1945 |
| 2,550,453 | Coggeshall | Apr. 24, 1951 |